G. B. Fisher,
Brick Machine,
No. 76,617.   Patented Apr. 14, 1868.
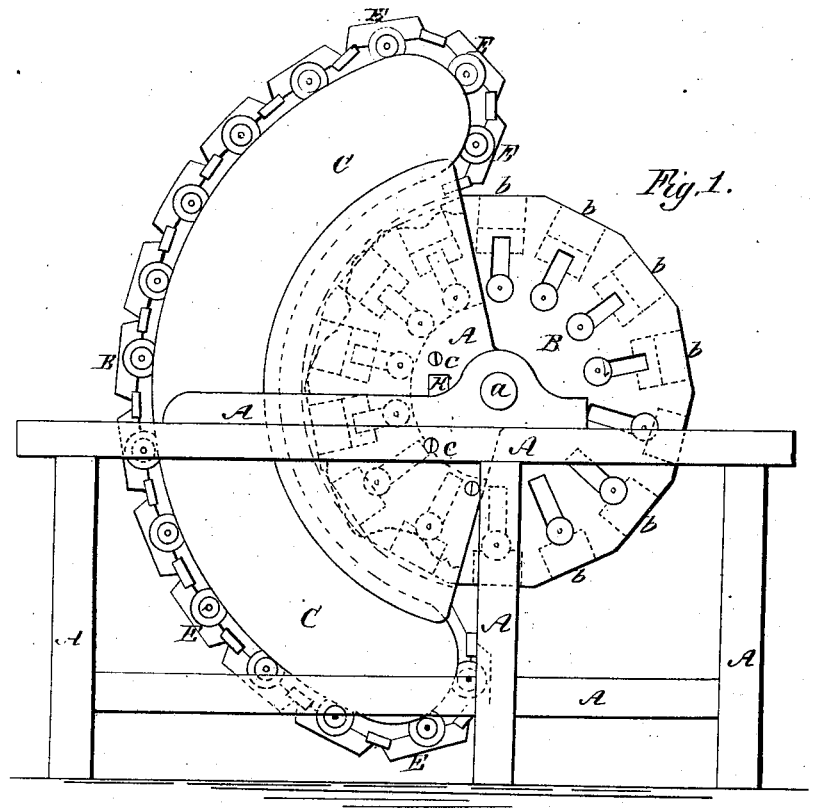
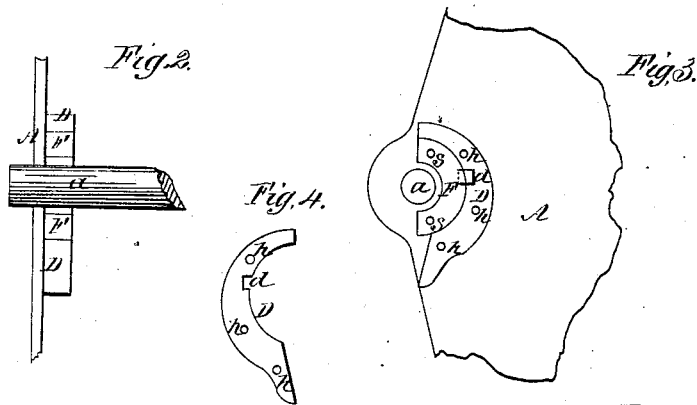
Witnesses.   Inventor.

United States Patent Office.

GEORGE B. FISHER, OF CHICAGO, ILLINOIS.

Letters Patent No. 76,617, dated April 14, 1868.

IMPROVEMENT IN BRICK-MACHINES.

*The Schedule referred to in these Letters Patent and making part of the same.*

TO ALL WHOM IT MAY CONCERN:

Be it known that I, GEORGE B. FISHER, of Chicago, in the county of Cook, and State of Illinois, have invented a new and useful Improvement in Brick-Machines; and I do hereby declare and make known that the following is a full, clear, and exact description of the same, reference being had to the accompanying drawings, and the letters and figures marked thereon, which form part of this specification.

My said invention relates to that class of brick-machines in which the moulds are arranged radially in a revolving cylinder, and the pressure is applied outwardly towards the circumference of said cylinder.

The great objection to the ordinary form of these machines is, that the block or surface which covers the outer end of the mould, being concave in shape, so as to conform to the cylindrical configuration of the circumference of the cylinder, that side of the brick is necessarily of a convex form, which is a great objection in laying the brick up in the wall.

This objection has been obviated in some machines, by subjecting the brick to a second pressure, by the application of additional mechanism for that purpose, which increases the expense and the complexity of the machine, and but imperfectly performs the desired work, requiring a great additional power to operate the machine.

My improvement has for its object the obviation of the aforesaid objection, and it consists in constructing the cylinder containing the moulds of a polygonal form, having as many plain sides as there are moulds, so that the blocks closing the outer ends of the moulds may have flat instead of concave surfaces presented to the brick in the press, thus producing a perfectly flat-sided brick, as desired, without any additional mechanism or power.

My invention further consists in providing the said machine with removable cams for operating the plungers in the moulds, instead of stationary cams, as heretofore, so that the amount of the pressure applied in pressing the bricks may be varied, so as to adapt the machine to working clay or other material of different degrees of hardness, which adaptation is found to be very important in the practical operation of the machine.

To enable those skilled in the art to understand how to construct and use my invention, I will proceed to describe the same with particularity, making reference, in so doing, to the aforesaid drawings, in which—

Figure 1 represents a side elevation of my invention.

Figure 2 is a detached end view, showing the mode of applying the cams which operate the plungers in the moulds.

Figure 3 is an interior side view of the same parts; and

Figure 4 is a separate side view of one of the removable cams aforesaid.

Similar letters of reference, in the different figures, denote the same parts of my invention.

The general features of the machine are the same as shown and described in a patent for peat and brick-machine, granted to me on the nineteenth day of November, A. D. 1867, and do not therefore require a special description; the parts which I especially claim, however, will now be particularly described.

B represents the cylinder containing the moulds, which are indicated by the dotted lines shown in fig. 1. It will be observed that the cylinder is polygonal in form, each mould presenting a plain exterior face, $b$, so that the blocks E, which close the moulds while the pressure is applied, which have a plain surface, may lie close upon the moulds, and form that side of the brick contiguous thereto flat, as desired.

F represents a semi-annular block, secured to or formed upon the interior of the frame A, at each side, back of the shaft $a$ of the polygonal mould-wheel, as indicated in figs. 2 and 3; and D represents the cams, which are so arranged as to operate upon the plungers in the moulds, to press the clay in the moulds, and also to remove the brick from the moulds, as is fully described in my former patent. These cams are formed separately from the frame, and are secured thereto by means of screws or bolts, $c$, which pass through holes, $h$, in the cams, and also by a key, $k$, which enters a recess, $d$, in said cam, as shown, and in the face of the block F. A set of these cams, D, of variable sizes, is provided, and when the clay is loose, so as to be susceptible of great compression, a larger-sized cam is inserted, and where the clay is hard and compact, so as to be less compressible, then smaller cams may be used.

The change of the cams D is effected by removing the screws $c$ and the key $k$, and drawing the cam out in front, from below the shaft, and the substituted cam is adjusted by inserting the thinner end under the lower end of the guides or blocks F, and pressing the same around up behind said guide, to the position indicated in fig. 3, when the key $k$ and the bolts $c$ are inserted, and the cams firmly and strongly secured in place.

This change of the cams can be effected in a very short time, and the machine rendered capable of doing perfect work in a kind of clay which could not, without such change, be practically made into perfect or marketable brick.

Having described the construction and nature of my invention, and its mode of operation, I will now specify what I claim, and desire to secure by Letters Patent.

1. I claim the combination of a series or chain of blocks, E, with a polygonal mould-wheel, B, arranged and operating substantially in the manner and for the purposes set forth and shown.

2. In combination with a revolving mould-wheel, B, provided with plungers operating as described, I claim the arrangement of the removable cams D, and their supports, F, substantially in the manner and for the purposes described.

GEO. B. FISHER.

Witnesses:
　W. E. MARRS,
　L. L. COBURN.